United States Patent
Fritz et al.

(10) Patent No.: US 10,538,195 B2
(45) Date of Patent: Jan. 21, 2020

(54) ADAPTIVE LIGHTING SYSTEM OF AN OFF-ROAD UTILITY VEHICLE

(71) Applicant: DEERE & COMPANY, Moline, IL (US)

(72) Inventors: Norbert Fritz, Mannheim (DE); Jürgen Hollstein, Mannheim (DE)

(73) Assignee: DEERE & COMPANY, Moline, IL (US)

(*) Notice: Subject to any disclaimer, the term of this patent is extended or adjusted under 35 U.S.C. 154(b) by 0 days.

(21) Appl. No.: 15/899,156

(22) Filed: Feb. 19, 2018

(65) Prior Publication Data

US 2018/0236928 A1    Aug. 23, 2018

(30) Foreign Application Priority Data

Feb. 21, 2017 (DE) .................. 10 2017 202 808
Mar. 30, 2017 (DE) .................. 10 2017 205 467

(51) Int. Cl.

| | | |
|---|---|---|
| *H05B 33/00* | (2006.01) | |
| *B60Q 1/24* | (2006.01) | |
| *B60Q 3/80* | (2017.01) | |
| *B60Q 3/18* | (2017.01) | |
| *B60Q 3/74* | (2017.01) | |
| *B60Q 1/14* | (2006.01) | |

(52) U.S. Cl.
CPC .............. *B60Q 1/24* (2013.01); *B60Q 1/143* (2013.01); *B60Q 3/18* (2017.02); *B60Q 3/74* (2017.02); *B60Q 3/80* (2017.02); *B60Q 2300/054* (2013.01); *B60Q 2300/23* (2013.01)

(58) Field of Classification Search
CPC .... B60Q 1/143; B60Q 1/24; B60Q 2300/054; B60Q 2300/23; B60Q 3/18; B60Q 3/74; B60Q 3/80
See application file for complete search history.

(56) References Cited

U.S. PATENT DOCUMENTS

| | | |
|---|---|---|
| 2013/0286671 A1 | 10/2013 | Breiner et al. |
| 2014/0211488 A1* | 7/2014 | Gupta .................. G08G 1/163 362/464 |

(Continued)

FOREIGN PATENT DOCUMENTS

| | | |
|---|---|---|
| DE | 102005036002 A1 | 2/2007 |
| DE | 102010040650 A1 | 3/2012 |

(Continued)

OTHER PUBLICATIONS

German Search Report issued in counterpart application No. 102017205467.0 dated Dec. 21, 2017. (10 pages).

(Continued)

*Primary Examiner* — Monica C King

(57) ABSTRACT

An adaptive lighting system of an off-road utility vehicle includes an illumination device controllable with respect to its emission characteristic or light intensity, and a control unit in communication with the illumination device. The control unit is configured to adapt the emission characteristic or light intensity level by controlling the illumination device based upon a determined gaze direction of a vehicle operator, an identified extraneous light effects, a determined relative position of an external off-road utility vehicle, or cartographic location information.

17 Claims, 3 Drawing Sheets

(56) References Cited

U.S. PATENT DOCUMENTS

| | | | |
|---|---|---|---|
| 2016/0185354 A1* | 6/2016 | Lisseman | B62D 1/046 |
| | | | 701/36 |
| 2016/0314763 A1* | 10/2016 | Matthews | G09G 5/02 |
| 2018/0196438 A1* | 7/2018 | Newlin | G05D 1/0214 |

FOREIGN PATENT DOCUMENTS

| | | |
|---|---|---|
| DE | 102014011117 A1 | 1/2016 |
| EP | 2158799 A1 | 3/2010 |
| EP | 2415637 A1 | 2/2012 |

OTHER PUBLICATIONS

European Search Report issued in counterpart application No. 18154059.2 dated Jul. 20, 2018. (7 pages).

* cited by examiner

ADAPTIVE LIGHTING SYSTEM OF AN OFF-ROAD UTILITY VEHICLE

RELATED APPLICATIONS

This application claims priority to German Patent Application Ser. No. 102017205467.0, filed Mar. 30, 2017, and German Patent Application Ser. No. 102017202808.4, filed Feb. 21, 2017, the disclosures of which are hereby expressly incorporated by reference in their entirety.

FIELD OF THE DISCLOSURE

The present disclosure relates to an adaptive lighting system of an off-road utility vehicle, and in particular, to a lighting system having an illumination device which is controllable with respect to its emission characteristic or light intensity.

BACKGROUND

A conventional lighting system in the form of an apparatus for adjusting a lighting level for a road vehicle is described in DE 10 2010 040 650 A1, for example. According to that system, on the basis of road trajectory information a control unit determines the visibility of bends that lie ahead, in order to the adjust the lighting depending on the visibility determined in such a way as to ensure the minimal level of glare for oncoming traffic. The known lighting system is primarily intended for use in road traffic.

Thus, in this disclosure, embodiments relate to an adaptive lighting system adapted to the requirements of off-road utility vehicles.

SUMMARY

In one embodiment of this disclosure, an adaptive lighting system of an off-road utility vehicle includes an illumination device, which is controllable with respect to its emission characteristic or light intensity, and a control unit, which adjusts the emission characteristic or light intensity by controlling the illumination device in accordance with an identified viewing direction of a vehicle operator, identified extraneous light effects, a determined relative position of an off-road utility vehicle or cartographic location information.

In this way, by evaluating the instantaneous viewing direction of the vehicle operator, it is possible to adjust the lighting to suit the current attentional focus of the vehicle operator so that an inconvenient manual adjustment of a desired illumination range of the ambient or working lighting of the off-road utility vehicle can be omitted during off-road usage. Here, consideration of the existing residual light or other (artificial) light sources is possible by observing possible extraneous light effects. On the basis of the determined relative position of external off-road vehicles, it is also possible to predict their potential entry into the illumination range of the ambient or working lighting of the off-road utility vehicle so that these predictions can also be incorporated into the respective illumination situation.

Possible cases here are those in which a plurality of off-road utility vehicles are driving on the same terrain in the agricultural arena, for example, a forage harvester and an agricultural tractor with a loader wagon approaching alongside the forage harvester. To monitor a load transfer process carried out while driving, it can be provided here that the illumination region of an ambient or working illumination of the forage harvester is selectively extended to the loader wagon. In addition, the consideration of cartographic location information allows a targeted planning, in particular of a desired illumination range of the ambient or working lighting along a section of road to be travelled. Thus it can be provided, for example, that obstacles or hazards (rocks, ditches and the like) are recorded cartographically, and when their associated position is reached they are visibly highlighted by means of additional illumination. Also, the surroundings of the section of road to be travelled can be taken into account to the extent that an adjacent road, settlements or the like can be excluded from the illumination range of the ambient or working illumination by appropriate adjustment of the emission characteristic or light intensity level in order to avoid unwanted glare. The appropriate cartographic location information can be collected off-line by means of a planning software application and then uploaded into the control unit of the adaptive lighting system.

In general, the off-road utility vehicle can be of any design, wherein conceivable applications include the use of the adaptive lighting system in agricultural tractors, harvesters, forage harvesters, forestry machinery, construction equipment or the like.

The illumination device is formed by an ambient or working lighting of the off-road utility vehicle or lighting provided inside a driver's cab, in particular in the form of illuminatable control and display elements or cabin interior lighting. The ambient or working lighting can include a plurality of headlights, which are mounted, for example, in the roof area of the driver's cab and which enable a two-dimensional or overlapping illumination of a surface of the terrain around the off-road utility vehicle.

To adapt the emission characteristic or light intensity, these can be switched both individually and varied in terms of their luminous intensity. It is conceivable that the individual headlights, in addition to their actual lamps (halogen or gas discharge lamps, LEDs or the like) also have optical devices for changing the emission characteristic, and therefore their emission angle, or the light distribution which depends on the emission angle. The optical devices can be formed either by electrically controllable optical systems (collimators or lens systems), or else by the lamp itself. In the latter case, this typically consists of a segmented LED matrix, in which individual matrix segments can be switched on and off and varied in their luminosity by the control unit.

In addition, the adaptive lighting system can have a further illumination device which forms part of an attachment or accessory device of the off-road utility vehicle, in particular in the form of a dedicated ambient or working lighting system. In this case, the additional illumination device in combination with the illumination device of the off-road utility vehicle is activated by the control unit in such a way that a desired overall lighting situation can be achieved.

In principle, the control unit reduces the luminosity in areas located outside of the viewing direction or prone to glare by adjusting the emission characteristic or light intensity of the illumination device. In this way, not only are electrical energy savings possible because the lighting can be confined to the areas within the attentional focus of the vehicle operator, but there is also a risk of glare from external off-road vehicles entering the illumination range of a working or ambient lighting of the off-road utility vehicle, which are relatively easily assessed on the basis of the extraneous light effects or the determined relative position of the relevant external off-road vehicle. The extraneous light effects (or scattered light effects) can be caused by the off-road utility vehicle's own ambient lighting, or the working lighting of other off-road utility vehicles.

Furthermore, the possibility exists that the control device can determine the view direction of the vehicle operator by optical sensing of the eye position or head posture. Such devices are known, for example, from the automotive sector in connection with systems for warning against falling asleep and comprise a camera which is integrated, for example, in a rear-view mirror or a housing enclosed by the rear-view mirror inside a passenger compartment in order to derive using associated image processing software, the degree of fatigue of the driver from characteristic indicators of this obtained from a recorded movement of the eyelids or pupils.

The control unit has a data interface for the wireless reception of position information broadcast by the external off-road utility vehicle, wherein the control unit determines the relative position by comparison with position information in relation to the agricultural vehicle. The assessment or determination of the relative position is carried out on the basis of a polar coordinate system, in which the off-road utility vehicle forms the origin of the coordinate system. The communication with the external off-road utility vehicle can be performed via an existing wireless network, either directly between the vehicles or else via a central data server or data cloud. It is also possible for the control unit to determine the relative position by optical environmental recognition based on a differentiation between moving and stationary objects carried out using image pattern recognition.

Typically, the position information related to the off-road utility vehicle is detected by means of a satellite-based navigation system. The satellite-based navigation system can be permanently installed in the agricultural vehicle, but it can also be a mobile navigation unit, for example, as a component of a tablet computer, mobile phone or the like, carried by the vehicle operator. In this case, the determined positional information is transmitted wirelessly to the control unit, for example, via an LTE or WLAN link.

In addition, it is conceivable that the control unit controls the illumination device in the event of a reduction in the light intensity in such a way that a predefined residual luminosity is not undershot. The maintenance of a specific residual luminosity, especially in connection with illuminatable operating and display elements, prevents the vehicle operator from being given the false impression that the associated functions are disabled or inactive. Such an impression can be created if the instrument lighting were to be completely switched off. Similar considerations apply to the case in which an ambient or working lighting of the off-road utility vehicle is switched off, which can cause irritation to the vehicle operator due to the delayed adaptation capability of the human eye. The residual luminosity, as well as a desired maximum luminosity, can be made manually specifiable by the vehicle operator.

In the simplest case, in order to determine the extraneous light effects, the control unit is connected by means of an ambient-sensing light or image sensor. The light or image sensor can be either one or a plurality of cameras mounted in the roof section of the driver's cab, in particular, a panoramic or 360-degree camera, or else light-sensitive sensor elements or individual cameras distributed along an outer side of the off-road utility vehicle.

Ideally, the ambient-sensing light or image sensor enables the light distribution in the environment of the off-road utility vehicle to be calculated, for which purpose said sensor can detect the extraneous light effects in terms of the emission characteristic or light intensity. This allows a particularly precise adaptation of the emission characteristic or brightness of the illumination device of the off-road utility vehicle, for example, by appropriate utilization of the determined light distribution of the extraneous light effects to achieve a consistent illumination level of the environment in the region of the off-road utility vehicle.

In addition, the control unit can perform a classification of the extraneous light effects by referencing with cartographic location information, wherein activation of the illumination device ceases if the classification reveals that the extraneous light influences originate from a stationary object. There is no glare hazard in this case as, for example, this will be a street light or floodlighting. The classification performed allows a reliable differentiation of such extraneous light effects from those that originate from other vehicles and for which an associated glare hazard exists. The classification itself can be obtained by comparing the cartographic location information with position information provided by a satellite-based navigation system.

For the sake of completeness, it should be noted that a plurality of off-road utility vehicles each equipped with the adaptive lighting system can form a fleet, wherein the individual fleet vehicles can communicate with each other via a wireless data communication link in order to coordinate or adjust the emission characteristics or light intensities of associated working or ambient lighting levels with a view to obtaining an optimal, or homogeneous, illumination of a terrain surface to be processed, or to avoid causing mutual glare among the vehicles.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawing, wherein.

DETAILED DESCRIPTION

Figure 1:
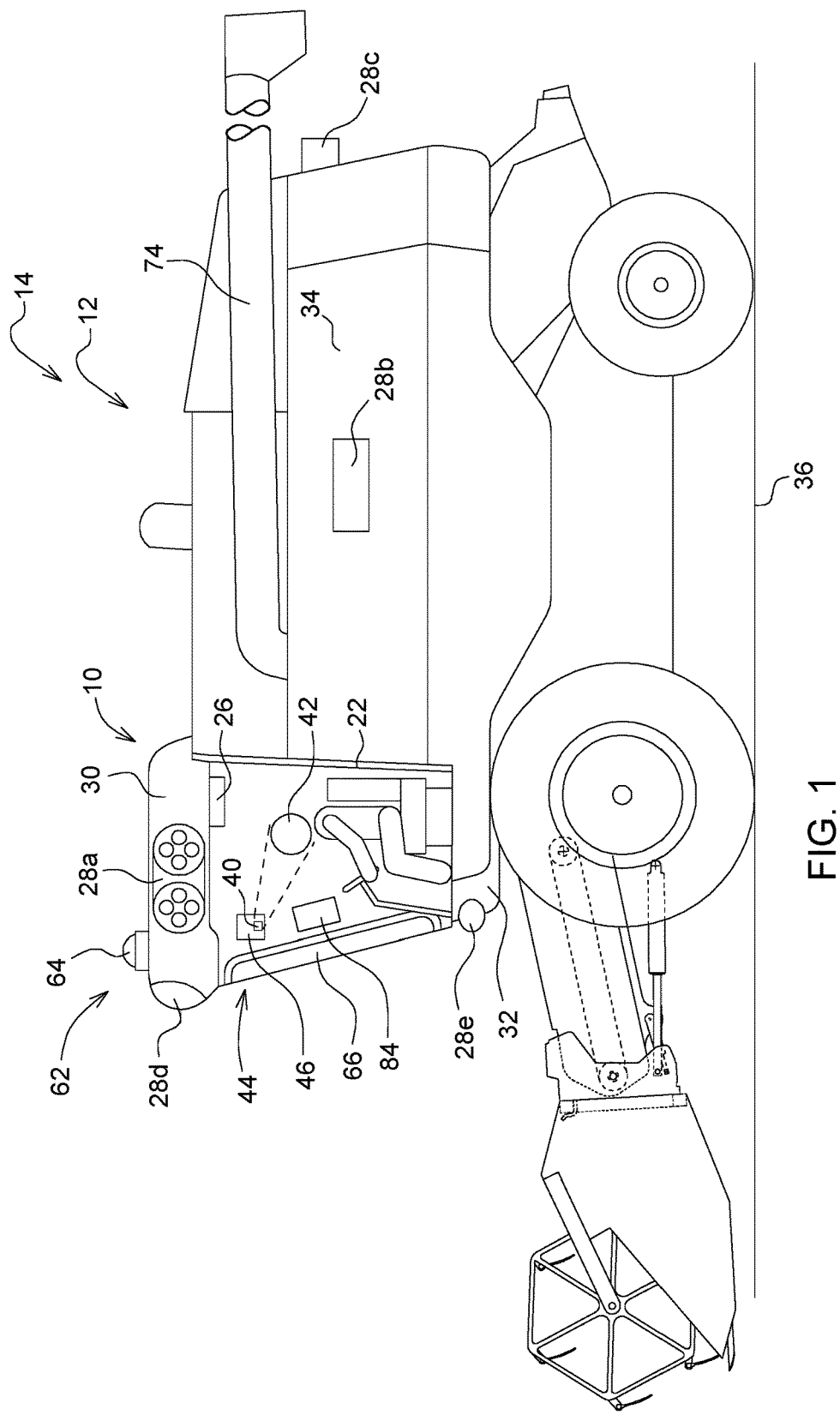
FIG. 1 is a schematic of an exemplary embodiment of the adaptive lighting system in an off-road utility vehicle in the form of a forage harvester.

FIG. 1 shows an exemplary embodiment of the adaptive lighting system according to the present disclosure, wherein this will be described below with reference to the block circuit diagram shown in FIG. 2. For example, the adaptive lighting system 10 is an integral part of an off-road utility vehicle 14 implemented as a forage harvester 12. In general, the off-road utility vehicle 14 can be of any design, wherein conceivable applications include the use of the adaptive lighting system 10 in agricultural tractors, harvesters, forestry machinery, construction equipment or the like.

Figure 2:
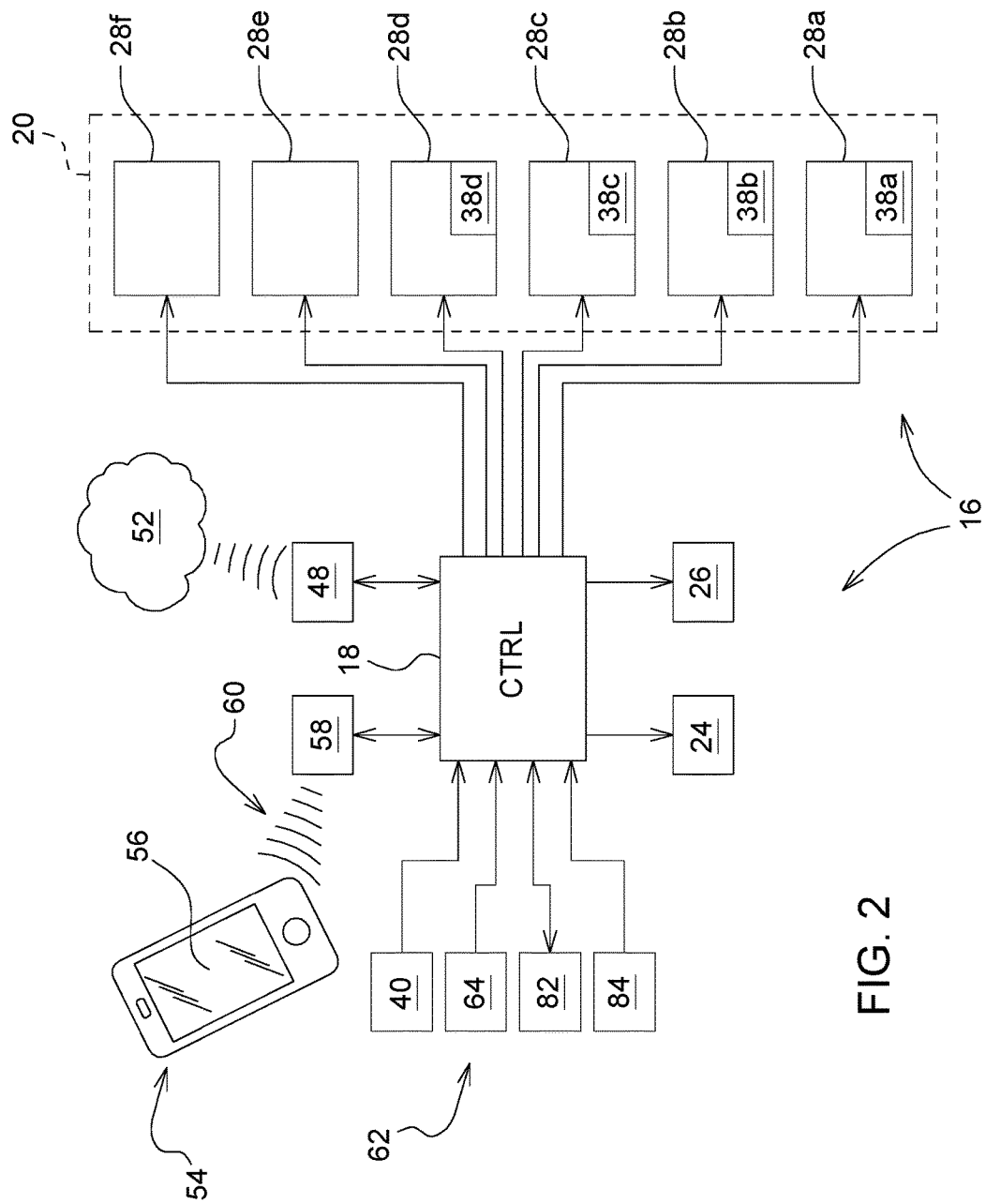
FIG. 2 is a block circuit diagram of the adaptive lighting system.

The adaptive lighting system 10 includes an illumination device 16 as shown in FIG. 2, which can be controlled by an electronic control unit 18 with respect to its emission characteristic or light intensity level.

More precisely, the illumination device 16 is formed by an ambient or working lighting 20 of the forage harvester 12 or an illumination provided inside a driver's cab 22, in the form of illuminatable control and display elements 24 or cabin interior lighting 26. According to FIG. 1, the ambient or working lighting 20 has a plurality of headlights 28a, 28b, 28c, 28d, 28e, which are mounted in a roof region 30 or on a front deflector 32 of the operator's cab 22 and also on part of the bodywork 34 of the forage harvester 12, and which enable an aerial or overlapping illumination of a terrain or field surface 36 surrounding the forage harvester 12. At least the headlights 28a, 28b, 28c can be activated individually and varied in terms of their luminous intensity by the control unit 18, for adapting the emission characteristic or light intensity. On the opposite side of the harvester 12 from the observer, additional headlights are located, corresponding to the side-mounted lights 28a, 28b.

In addition to the actual lamp (Halogen or gas discharge lamp, LEDs or the like), the headlights 28a, 28b, 28c have optical devices 38a, 38b, 38c for changing the emission characteristic, and consequently, the emission angle or the emission angle-dependent light distribution. The optical devices 38a, 38b, 38c not shown in detail in FIG. 1 can be formed either by electrically controllable optical systems (collimators or lens systems), or else by the lamp itself. In the latter case, this consists of a segmented LED matrix, in which individual matrix segments can be switched on and off and varied in their luminosity by the control unit 18. This is illustrated as an example of the side-mounted lights 28a arranged in the roof area 30 of the driver's cab 22.

Inside the driver's cab 22 is a camera 40 for optically detecting the eye position or head posture of a vehicle operator 42. The information obtained in this respect is fed to the control unit 18 to determine the instantaneous viewing direction of the vehicle operator 42 using image processing software. The camera 40 is integrated in a rear-view mirror 44 or a housing 46 covered by the rear-view mirror 44.

Figure 3:
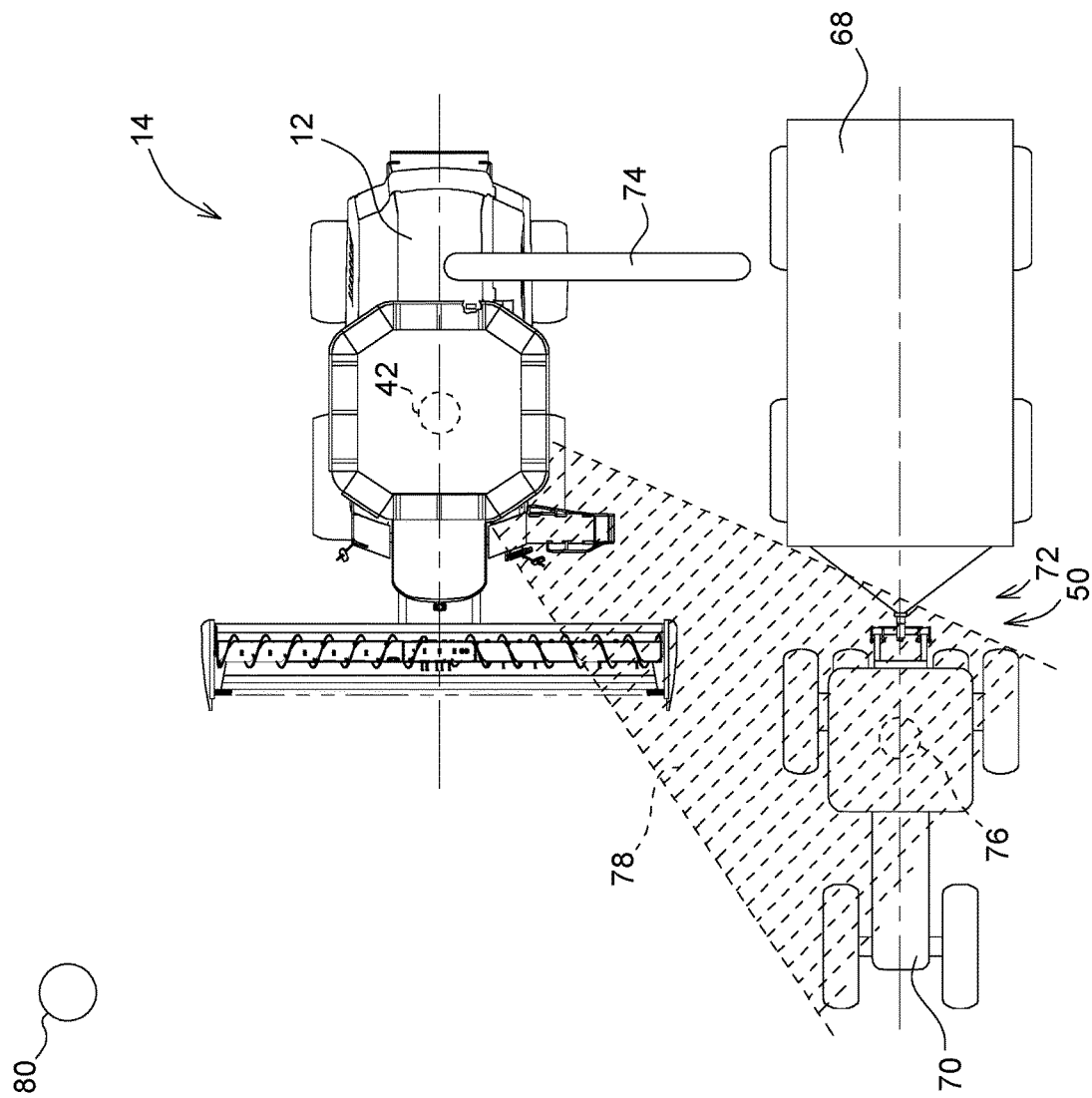
FIG. 3 is a schematic of an example lighting scene for the case of an external off-road utility vehicle, approaching alongside the forage harvester shown in FIG. 1, in the form of a vehicle-trailer combination consisting of a loading wagon and an agricultural tractor.

In addition, the control unit 18 has a data interface 48 for the wireless reception of position information broadcast by an external off-road utility vehicle 50 (see also FIG. 3). The position information broadcast by the external off-road utility vehicle 50 is located in a data cloud 52 and can be retrieved from there via the data interface 48 using an existing wireless network.

On the basis of the position information received, the control unit 18 determines a relative position of the forage harvester 12 with respect to the external off-road utility vehicle 50, for which purpose the control unit performs a comparison with position information in relation to the forage harvester 12. The assessment or determination of the relative position is carried out on the basis of a polar coordinate system, in which the forage harvester 12 forms the origin of the coordinate system.

The position information related to the forage harvester 12 is captured by means of a satellite-based navigation system 54. The satellite-based navigation system 54 is either permanently installed in the forage harvester 12 or else implemented as a mobile navigation unit 56. The latter is a component part of a mobile telephone of the vehicle operator 42, wherein the calculated position information is transmitted wirelessly to the control unit 18 via an LTE connection 60 established by means of a wireless interface 58.

In addition, in order to determine potential extraneous light effects, the control unit 18 is connected to an ambient-sensing light or image sensor 62. The light or image sensor 62 is a panorama or 360-degree camera 64 arranged in the roof area 30 of the driver's cab 22. By way of deviation from this, it can also be light-sensitive sensor elements or individual cameras (not shown), distributed along an outer side of the forage harvester 12.

The ambient-sensing light or image sensor 62 enables the light distribution in the environment of the forage harvester 12 to be calculated, for which purpose said sensor detects the extraneous light effects in terms of the emission characteristic or light intensity.

The information items determined in such a way in relation to the instantaneous viewing direction of the vehicle operator 42, possible extraneous light effects or the relative position of the external off-road utility vehicle 50, are fed to the control unit 18 in the form of corresponding data signals, wherein the control unit 18 adjusts the emission characteristic or light intensity by controlling the illumination device 16 in accordance with the identified information.

In this context, a first control routine executed by the control unit 18 is designed to reduce the light intensity in areas outside the viewing direction of the vehicle operator 42 by adjusting the emission characteristic or the light intensity of the illumination device 16.

The control unit 18 thus reduces the brightness of the rear-facing light 28c, if based on the determined viewing direction it is found that the vehicle operator 42 has not looked backwards for some time, which can occur either by a turn of the head or by looking in the rear view mirror 44. If, on the other hand, the vehicle operator 42 turns his gaze toward the rear again, then the control unit 18 increases the brightness of the rear-facing light 28c to its original value.

Similar considerations apply to the adjustment of the brightness of the side-mounted lights 28a, 28b, as well as to the illuminatable operating and display elements 24 or the cab interior lighting 26 (provided this allows an independent control of the lighting of individual cabin areas) in order to minimize disturbing stray light inside the driver's cab 22, in particular as a result of reflections from glass surfaces 66 or the like. Exceptions to this, for reasons of driving safety, are the front headlights 28d, 28e of the forage harvester 12 oriented in the direction of travel.

As a result, the first control routine leads to savings of electrical energy, because the lighting can be restricted to areas located in the focus of attention of the vehicle operator 42. This is particularly important in the case of battery powered systems, since this is where the optimal use of the available battery capacity is of particular importance.

In the case of a second control routine executed by the control unit 18, an adaptation of the emission characteristic or light intensity of the illumination device 16 is made in accordance with cartographic location information. The consideration of cartographic location information allows a targeted planning, in particular of a desired illumination range of the ambient or working lighting 20 along a section of road to be travelled. Thus it is provided that obstacles or hazards (rocks, ditches and the like) are recorded cartographically, and when their associated position is reached they are visibly highlighted by means of additional illumination. The latter is carried out by comparison with the position information supplied by the satellite-based navigation system 54. Also, the surroundings of the section of road to be travelled are taken into account, to the extent that an adjacent road, settlements or the like can be excluded from the illumination range of the ambient or working illumination by appropriate adjustment of the emission characteristic or light intensity level, in order to avoid an unwanted glare. The appropriate cartographic location information can be collected off-line by means of a planning software application and then uploaded into the control unit 18 of the adaptive lighting system.

A third control routine executed by the control unit 18 is designed to reduce the brightness in areas prone to glare by adjusting the emission characteristic or light intensity of the illumination device 16, to reduce the risk of glare from external off-road utility vehicles entering the illumination range of the forage harvester 12.

Such a lighting situation is shown in FIG. 3, which shows an example lighting scene for the case of an external off-road utility vehicle 50, approaching alongside the forage harvester 12, in the form of a vehicle-trailer combination 72 consisting of a loader wagon 68 and an agricultural tractor 70. To monitor a load transfer process carried out while driving, it is provided among other things that the illumination region of the ambient or working illumination 20 of the forage harvester 12 is selectively extended to the loader wagon 68.

For this purpose, from the position information received from the data cloud 52 via the data interface 48, the control unit 18 determines the current relative position of the loader wagon 68 with respect to the forage harvester 12 or a spout 74 provided thereon. The agricultural tractor 70 has a dedicated ambient or working lighting (not shown), wherein the light distribution determined by the control unit 18 using the ambient-sensing light or image sensor 62 in the adaptation of the emission characteristic or light intensity of the illumination device 16 is incorporated into the general lighting situation in such a way that on the one hand, an optimal or homogeneous illumination of the environment or field surface 36 is ensured in the area of the forage harvester 12, and on the other hand, any glare experienced by a vehicle operator 76 of the agricultural tractor 70 is eliminated. The agricultural tractor 70 is located, so to speak, in a darkened area 78 excised by the illumination device 16, which tracks the movement of the agricultural tractor 70 according to the particular relative position identified. This also applies in particular to the case where the illustrated vehicle-trailer combination 72 drives away after filling the loader wagon 68 and a new vehicle-trailer combination with an empty loader wagon approaches the forage harvester 12 and enters the illumination range of the ambient or working lighting 20 of the forage harvester 12, something which can be predicted on the basis of the relative position determined for the new vehicle trailer.

In addition, the control unit 18 performs a classification of the extraneous light effects by referencing with cartographic location information, wherein activation of the illumination device 16 ceases if the classification reveals that the extraneous light effects originate from a stationary object 80. There is no glare hazard in this case since, for example, this will be a street light or floodlighting. The classification performed allows a reliable differentiation of such extraneous light effects from those that originate from other vehicles and for which an associated glare hazard exists. The classification itself can be obtained by comparing the cartographic location information stored in a memory unit 82 with the position information provided by a satellite-based navigation system 54.

The three control routines can run in the control unit 18 one after another, or alternately to one another. An appropriate selection of the desired control routine can be made by the vehicle operator 42 using an operator terminal 84 connected to the control unit 18, via which the headlights 28a, 28b, 28c to be included in the lighting situation can also be pre-selected manually. In addition, an automatic mode can also be provided, in which by evaluating the instantaneous viewing direction of the vehicle operator 42 the illumination is adjusted to the current focus of attention of the vehicle operator 42, so that, in particular, an inconvenient manual adjustment of a desired illumination range of the ambient or working lighting 20 of the forage harvester 12 can be omitted when tending the field. In this case, the adaptation of the lighting for the purpose of taking account of the existing residual light or other (artificial) light sources in accordance with the identified extraneous light effects is modified by the control unit 18.

If the automatic mode is switched off, the vehicle operator has the option to manually adjust a desired emission characteristic or light intensity via the operator terminal 84.

Regardless of the respective control routine, the control unit 18 always controls the illumination device 16 in the event of a reduction in the light intensity, in such a way that a specified residual luminosity is not undershot. The residual luminosity, as well as a desired maximum luminosity, can be made to be manually specifiable by the vehicle operator via the operator terminal 84.

The lighting situation shown in FIG. 3 is intended only to illustrate the function of the adaptive lighting system for the case where a plurality of off-road utility vehicles is driving on the same field, and one of the off-road vehicles is equipped with the adaptive lighting system. However, any other illumination situations are also possible in which a plurality of off-road utility vehicles each equipped with the adaptive lighting system forms a fleet, wherein the individual fleet vehicles can communicate with each other over a wireless data communication link in order to coordinate or adjust the emission characteristics or light intensities of associated working or ambient lighting levels with a view to obtaining an optimal, or homogeneous, illumination of a terrain surface to be tended, or to avoid causing mutual glare among the vehicles.

While embodiments incorporating the principles of the present disclosure have been described hereinabove, the present disclosure is not limited to the described embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. An adaptive lighting system of an off-road utility vehicle, comprising:
    an illumination device controllable with respect to its emission characteristic or light intensity; and
    a control unit in communication with the illumination device;
    wherein, the control unit is configured to adapt the emission characteristic or light intensity level by controlling the illumination device based upon a determined gaze direction of a vehicle operator, an identified extraneous light effects, a determined relative position of an external off-road utility vehicle, or cartographic location information; and
    wherein the control unit is configured to reduce the light intensity in areas external to the off-road utility vehicle on a side or rear of the off-road utility vehicle which are outside of the viewing direction and increase the light intensity in areas external to the off-road utility vehicle on a side rear of the off-road utility vehicle which are within the viewing direction by adjusting the light intensity or the emission characteristic of the illumination device.

2. The adaptive lighting system of claim 1, wherein the control device is configured to determine the viewing direction of the vehicle operator by optical detection of the eye position or head posture.

3. The adaptive lighting system of claim 1, wherein:
the control unit comprises a data interface for the wireless reception of position information broadcast by the external off-road utility vehicle; and
the control unit determines the relative position by comparison with position information related to the external off-road utility vehicle.

4. The adaptive lighting system of claim 1, wherein the position information related to the off-road utility vehicle is detected by means of a satellite-based navigation system.

5. The adaptive lighting system of claim 1, wherein the control unit controls the illumination device in the event of a reduction in the light intensity in such a way that a specified residual luminosity is not undershot.

6. The adaptive lighting system of claim 1, wherein the control unit is connected by means of an ambient-sensing light or image sensor to determine the extraneous light effects.

7. The adaptive lighting system of claim 6, wherein the ambient-sensing light or image sensor detects the extraneous light effects with regard to the emission characteristic or light intensity level.

8. The adaptive lighting system of claim 1, wherein the control unit performs a classification of the extraneous light effects by referencing with cartographic location information, wherein activation of the illumination device ceases if the classification reveals that the extraneous light influences originate from a stationary object.

9. An off-road utility vehicle, comprising:
an operator's cab including controls for controlling the vehicle;
an adaptive lighting system comprising an illumination device controllable with respect to its emission characteristic or light intensity; and
a control unit in communication with the illumination device;
wherein, the control unit is configured to adapt the emission characteristic or light intensity level by controlling the illumination device based upon a determined gaze direction of a vehicle operator, an identified extraneous light effects, a determined relative position of an external off-road utility vehicle, or cartographic location information;
wherein the control unit is configured to extend illumination towards a portion of the external off-road utility vehicle and reduce the illumination towards an operator of the external off-road utility vehicle by adjusting the light intensity or the emission characteristic of the illumination device; and
wherein the control unit is configured to reduce the light intensity in areas external to the off-road utility vehicle on a side or rear of the off-road utility vehicle which are outside of the viewing direction and increase the light intensity in areas external to the off-road utility vehicle on a side or rear od the off-road utility vehicle which are within the viewing direction by adjusting the light intensity or the emission characteristic of the illumination device.

10. The off-road utility vehicle of claim 9, wherein the control device is configured to determine the viewing direction of the vehicle operator by optical detection of the eye position or head posture.

11. The off-road utility vehicle of claim 9, wherein:
the control unit comprises a data interface for the wireless reception of position information broadcast by the external off-road utility vehicle; and
the control unit determines the relative position by comparison with position information related to the external off-road utility vehicle.

12. The off-road utility vehicle of claim 9, wherein the position information related to the off-road utility vehicle is detected by means of a satellite-based navigation system.

13. The off-road utility vehicle of claim 9, wherein the control unit controls the illumination device in the event of a reduction in the light intensity in such a way that a specified residual luminosity is not undershot.

14. The off-road utility vehicle of claim 9, wherein the control unit is connected by means of an ambient-sensing light or image sensor to determine the extraneous light effects.

15. The off-road utility vehicle of claim 14, wherein the ambient-sensing light or image sensor detects the extraneous light effects with regard to the emission characteristic or light intensity level.

16. The off-road utility vehicle of claim 9, wherein the control unit performs a classification of the extraneous light effects by referencing with cartographic location information, wherein activation of the illumination device ceases if the classification reveals that the extraneous light influences originate from a stationary object.

17. The adaptive lighting system of claim 1, wherein the control unit is configured to extend illumination towards a portion of the external off-road utility vehicle and reduce the illumination towards an operator of the external off-road utility vehicle by adjusting the light intensity or the emission characteristic of the illumination device.

* * * * *